United States Patent [19]

Balasubramanian

[11] Patent Number: 5,649,072
[45] Date of Patent: Jul. 15, 1997

[54] ITERATIVE TECHNIQUE FOR REFINING COLOR CORRECTION LOOK-UP TABLES

[75] Inventor: Thyagarajan Balasubramanian, Webster, N.Y.

[73] Assignee: Xerox Corporation, Stamford, Conn.

[21] Appl. No.: 472,080

[22] Filed: Jun. 7, 1995

[51] Int. Cl.⁶ .............................. G06K 15/00; G03F 3/08; H04N 1/46
[52] U.S. Cl. ....................... 395/109; 358/518; 358/504
[58] Field of Search ............................... 395/109, 101; 358/518, 523, 525, 515, 504, 501, 524, 530; 382/167, 162

[56] References Cited

U.S. PATENT DOCUMENTS

| | | | |
|---|---|---|---|
| 4,500,919 | 2/1985 | Schreiber | 358/78 |
| 5,065,234 | 11/1991 | Hung et al. | 358/523 |
| 5,107,332 | 4/1992 | Chan | 358/518 |
| 5,491,568 | 2/1996 | Wan | 358/518 |
| 5,528,386 | 6/1996 | Rolleston et al. | 358/518 |
| 5,539,522 | 7/1996 | Yoshida | 358/518 |

*Primary Examiner*—Arthur G. Evans
*Assistant Examiner*—Tracy M. Legree
*Attorney, Agent, or Firm*—Fay, Sharpe, Beall, Fagan, Minnich & McKee

[57] ABSTRACT

A color correction table (10) is generated which converts colorimetric RGB locations into device RGB color space. The conversions are determined based on a printer response of a printer (12) by inputting a set of device RGB values to be printed. The printer (12) prints a corresponding set of RGB color patches. A measuring device (14) measures each color patch and determines a colorimetric RGB location for each color patch. A transformer (16) determines a transformation for each colorimetric RGB location and its corresponding device RGB value which are then stored in the RGB locations of the color correction table (10). The table (10) is then refined by inputting the originally measured colorimetric RGB locations to the table (10) and recovering table device RGB values. A comparator (18) compares the table device RGB values with the originally printed device RGB values and determines a residual error for each colorimetric RGB location. An interpolator (18) interpolates the found residual errors to the other RGB locations of the color correction table based on a weighted sum of the found residual errors and a Euclidean distance between the RGB locations. A refining means (22) refines each of the table device RGB values with the interpolated residual errors. The refinement steps are then repeated until the residual errors are within a selected tolerance.

8 Claims, 2 Drawing Sheets

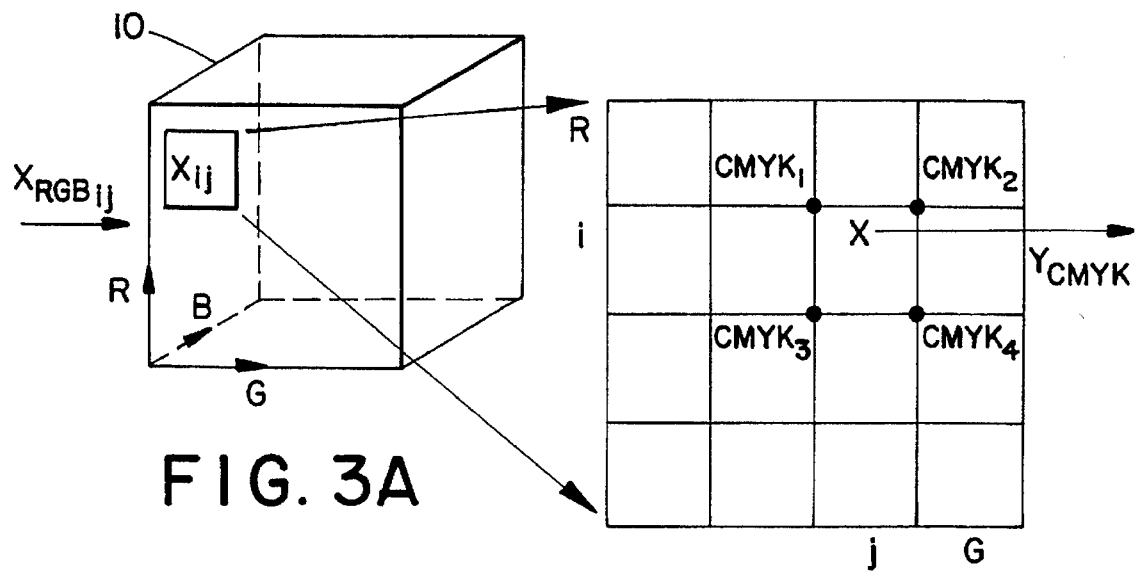
FIG. 3A
FIG. 3B
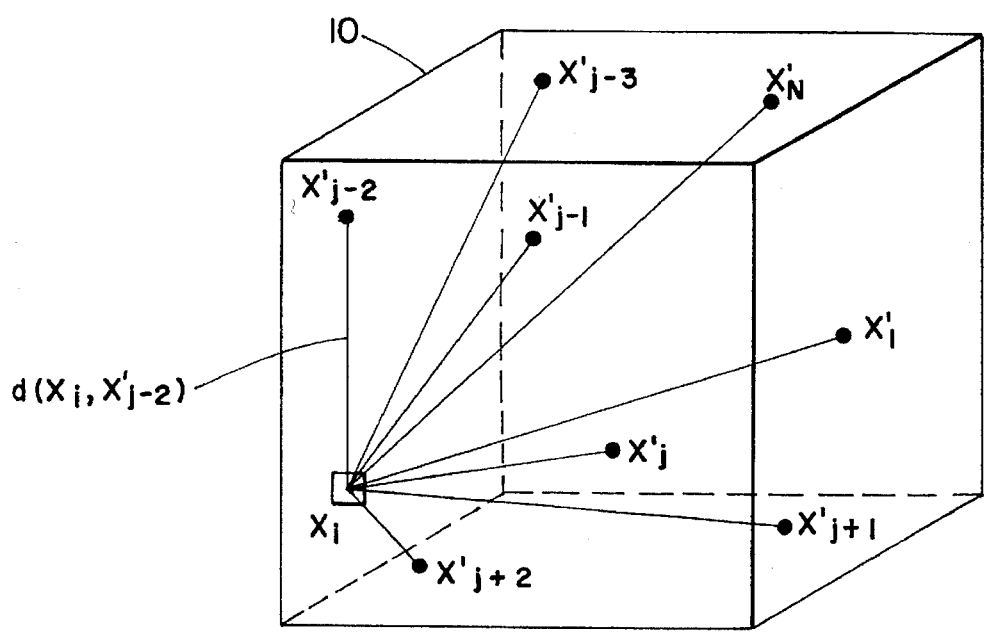
FIG. 4

ITERATIVE TECHNIQUE FOR REFINING COLOR CORRECTION LOOK-UP TABLES

BACKGROUND OF THE INVENTION

The present invention relates to the color imaging arts. It finds particular application to color correction tables for printers and will be described with particular reference thereto.

Heretofore, computers and other electronic equipment have typically generated three-dimensional RGB (red, green, blue) color signals. Many printers, however, receive four-dimensional CMYK (cyan, magenta, yellow, and black) signals as input and print output colors which are measured as corresponding RGB values. A look-up table is commonly provided to convert each digital RGB color signal value to a corresponding digital CMYK value before being received by the printer.

A printer which has an ideal dye behavior has a one-to-one correspondence of cyan-to-red, magenta-to-green, and yellow-to-blue. This means that when printed, the cyan ink will only absorb red light, the magenta ink will only absorb green light, and the yellow ink will only absorb blue light. However, printers inherently have a non-ideal dye behavior and therefore have a complex non-linear colorimetric response. Interactions between the cyan, magenta, and yellow inks exist which result in unwanted absorptions of reds, greens, and blues. Even once a printer is calibrated such that one or a range of input digital CMYK values produce the proper color(s), the full spectrum of CMYK values and printed colors is not accurate. In other words, the colors asked to be printed and the actual colors printed are not the same.

This discrepancy arises because the relationship between digital values that drive the printer and the resulting colorimetric response is a complex non-linear function. A response, or other value, labeled as "colorimetric" indicates that the response or value which has been measured by an instrument. Modeling the colorimetric response to achieve linearity across the available spectrum usually requires many parameters. Therefore, the relationship between the CMYK values driving the printer and the measured colorimetric RGB values of the resulting printed patch is often not characterizable by a simple function or model. The number of measurements required to characterize the printer adequately, can be as many as 1,000 measurements. Typically, a color correction look-up table is built which approximates the mapping between RGB colorimetric space and CMYK values. More specifically, the color correction look-up table corrects for non-linearities and unwanted absorptions of inks such that the printer prints the true corresponding color.

To build the look-up table, a set of CMYK digital values are sent to the printer. The printer prints a corresponding set of color patches. The color patches are measured and a colorimetric RGB coordinate is found for each patch, hence for each CMYK value. Each of the RGB coordinates identify a three-dimensional vector location within the three-dimensional space. Each RGB coordinate is typically represented by an 8-bit red value, an 8-bit green value, and an 8-bit blue value. Although the RGB coordinate is capable of addressing $256^3$ locations, the look-up table is typically partitioned into a smaller size, such as 16×16×16 (4096) table locations, each of which stores a four-dimensional CMYK value. The number of table locations is selected based on the desired accuracy of the look-up table compared to the expense of storing a large number of values.

At each measured RGB location, the CMYK value corresponding to the RGB coordinate is known. Measured RGB coordinates do not in general coincide with the node locations (intersection points) of the look-up table. Hence, the CMYK values to be filled-in at the table nodes are estimated from the known CMYK values at the measured RGB locations by an interpolation technique such as Shepard's algorithm. Once the table is built, RGB coordinates are converted to CMYK values by interpolating the nearest known CMYK values neighboring the inputted RGB coordinate location to obtain an interpolated printer CMYK value. The interpolating is commonly a tetrahedral or trilinear interpolation. Thus, the variables in the design of the correction table are the RGB locations, the CMYK values at the locations, and the method used to interpolate between the CMYK values.

Due to drifts in printer response and the interpolation technique used to map the transformations, a particular colorimetric RGB location may not produce the correct printer CMYK value. In order to adjust for the difference, CMYK values are reprinted and the color patches are remeasured to determine the error. Remeasuring color patches is an expensive and time-consuming process.

The present invention provides a new and improved method and apparatus for refining a color correction table which overcomes the above-referenced problems and others.

SUMMARY OF THE INVENTION

In accordance with the present invention, a new and improved iterative technique for refining a color correction table of a printer is provided. The color correction table has a plurality of RGB node locations which store a CMYK value for converting the RGB node location into CMYK color space. The color correction table is generated by printing color patches for a plurality of CMYK values. Each printed color patch is measured to obtain a colorimetric RGB location. A transformation vector is calculated for each of the colorimetric RGB locations which transforms the colorimetric RGB location to the corresponding CMYK value. The calculated transformation vectors are interpolated to the RGB node locations of the color correction table to obtain table transformation vectors for thee RGB node locations. Each table transformation vector is based on a weighted sum of the calculated transformation vectors and a Euclidean distance between a current table location and the RGB node locations storing the calculated transformation vectors. The table transformation vectors are combined for the RGB node locations of the table to obtain the corresponding CMYK values. The color correction table is then refined by inputting the measured colorimetric RGB locations into the color correction table and recovering corresponding CMYK values. For each of the colorimetric RGB locations, the recovered CMYK values are compared to the originally printed CMYK values to obtain a printer residual error for each of the colorimetric RGB locations. The printer residual errors are interpolated to the node locations in the color correction table as a weighted sum combined with a function of a Euclidean distance between a current node location and the colorimetric RGB locations. The CMYK values of the color correction table are refined by combining the interpolated residual errors with the CMYK values. The table CMYK values are iteratively refined until the residual errors are within a selected tolerance.

One advantage of the present invention is that the color correction table is iteratively refined with the same measurements used in generating the color correction table.

Another advantage of the present invention is that additional measurements of color patches are not required.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

FIG. 3A is an illustration of a color correction table converting an RGB location to a CMYK value in accordance with the present invention;

FIG. 3B is an enlargement of a section of the color correction table shown in FIG. 3A; and, FIG. 4 is an illustration of a location in the color correction table being interpolated based on distances to known locations in accordance with the present invention.

DETAILED DESCRIPTION OF THE PREFERRED EMBODIMENTS

Figure 1:
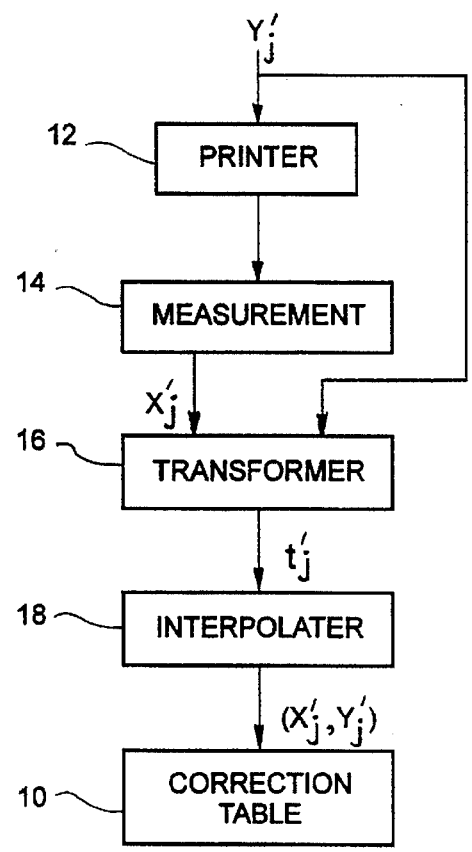
FIG. 1 is a diagrammatic illustration of a color correction table generator.

With reference to FIG. 1, a color correction table 10 is a three-dimensional table having an R axis, G axis, and B axis representing red, green, and blue colorimetric locations. Each location is identified in the preferred embodiment by a three-dimensional RGB vector which is defined by an 8-bit red value, an 8-bit green value, and an 8-bit blue value. In the preferred embodiment, the color correction table 10 is partitioned into 16×16×16 or 4096 intersecting node locations. Each location stores a CMYK value for converting the RGB address to CMYK color space. For other RGB addresses, the CMYK value is found by interpolating the CMYK values of the nearest node locations.

With reference to FIGS. 3A and 3B, the color correction table 10 converts an inputted RGB location $X_{RGB}$ to a corresponding CMYK value $Y_{CMYK}$. For simplicity, FIG. 3B shows a two-dimensional grid of R and G locations with the B value set to zero. For an input RGB color $X_{ij}$ at $(R_i, G_j)$, the corresponding CMYK value $Y_{CMYK}$ is found by interpolating the CMYK values stored at the nearest neighbor locations of $(R_i, G_j)$ which are $CMYK_1–CMYK_4$ in this example. Preferably, a trilinear or tetrahedral interpolation is performed as is known in the art. As is shown, RGB values such as $X_{ij}$ do not always lie on an intersecting table location.

The color correction table 10 is generated for a printer 12 based on the printing characteristics of the printer 12. The printer characteristics are determined by inputting a set of CMYK values $y_j$, $1 \leq j \leq K$ to the printer 12. The number of values K is about 1000. The printer 12 prints a set of color patches, one patch for each CMYK value. A measuring device 14 measures each patch to obtain corresponding colorimetric RGB locations $x_j$. Typical measuring devices 14 include colorimeters, spectrophotometers, or similar devices. For simplicity, we will discuss three-color (CMY) rather than four-color (CMYK) printing device values $y_j'$ in device RGB coordinates, $R_d$, $G_d$, $B_d$, where $R_d=1-C$, $G_d=1-M$, and $B_d=1-Y$.

Given the colorimetric RGB locations $x_j'$ and the corresponding device RGB printer values $y_j'$, the color correction table 10 is generated to map a given colorimetric RGB location to a device RGB value. Assuming that the color correction table 10 has a fixed table size of N, the table 10 has a set of colorimetric RGB locations $\{x_i\}$, each storing a device RGB value $y_i$ for i=1 to N which converts the RGB location to device RGB color space. In general, the table node locations do not coincide with the measured RGB coordinates. There are several methods, well known in the art, for estimating device RGB values at the table node locations, based on the known device RGB values at the measurement locations. One such method is now described, which is used in the preferred embodiment.

For each of the known colorimetric RGB locations $x_j'$ that were measured, a transformation processor 16 calculates a transformation vector $t_j'$. The transformation vector $t_j'$ represents a transformation difference between the inputted device RGB values $y_j'$ and the outputted measured RGB values $x_j'$ and is defined as:

$$t_j' = y_j' - x_j', \quad 1 \leq j \leq K \tag{1}$$

For the measured RGB locations $x_j'$, the transformation vectors $t_j'$ are stored. Since the number of measured RGB locations $x_j'$ (typically about 1000) is less than the number of locations in the table 10 (4096 locations) and generally will not lie exactly on a table location, the transformations for each location are determined by interpolation. An interpolator 18 interpolates the transformation vectors $t_j'$ through all N locations of the color correction table 10 and finds a table transformation vector $t_i$ for each table location denoted by $x_i$. Each table transformation vector $t_i$ is defined as a weighted sum of the known transformation vectors $t_j'$ at the measured colorimetric RGB locations $x_j'$:

$$t_i = \begin{cases} \sum_{j=1}^{K} \frac{1}{d_{ij}^4} \, t_j' / \sum_{j=1}^{K} \frac{1}{d_{ij}^4}, & d_{ij} > d_t \\ t_j', & d_{ij} \leq d_t \end{cases} \quad 1 \leq i \leq N. \tag{2}$$

The weighted sum is based on a Euclidean distance $d_{ij}$ between a current table location $x_i$ and the measured RGB locations $x_j'$ as shown in FIG. 4. As the distance $d_{ij}$ increases between the table location $x_i$ and the measured RGB locations $x_j'$, the contribution of the transformation vector $t_j'$ on $x_i$ decreases as $1/d_{ij}^4$. In the preferred embodiment, the power of 4 is used so that the sum in Equation (2) converges in $R^3$. A higher or lower power may be used for other different domain space. For example, if the domain space is $R^n$, then the $d_{ij}$ is raised to a power greater than n.

Once a transformation vector is found for each RGB location in the table 10; a table device RGB value $y_i$ is found for each RGB location. The table device RGB values $y_i$ are filled as a combination of the RGB locations $x_i$ and the table transformation vectors $t_i$:

$$y_i = x_i + t_i \tag{3}.$$

To recover a table device RGB value y for an inputted RGB location x, the table device RGB values neighboring the RGB location x are interpolated as shown in FIG. 3B. In the preferred embodiment, tetrahedral interpolation is used.

Figure 2:
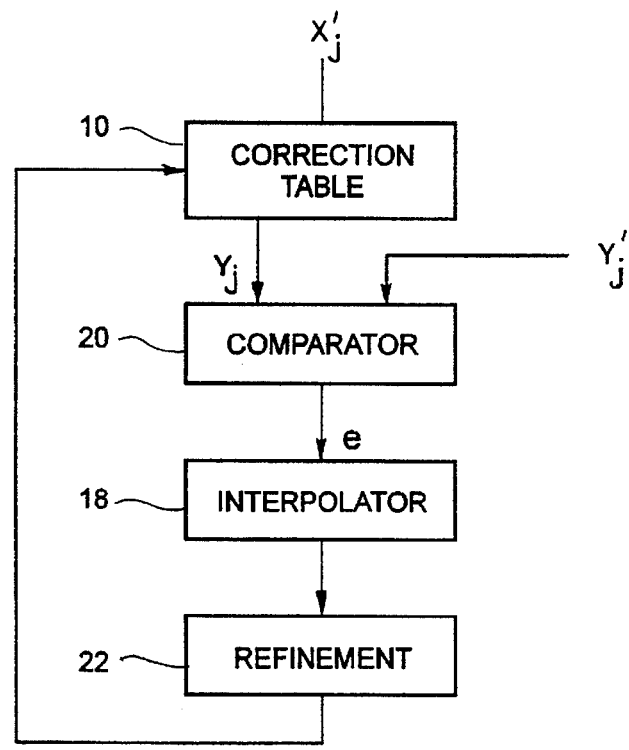
FIG. 2 is a diagrammatic illustration of the iterative refining system in accordance with the present invention.

With reference to FIG. 2, the refining system of the present invention is shown. To verify the accuracy of the table device RGB values $y_i$, the originally measured colorimetric RGB locations $x_j'$ are inputted to the color correction table 10. If the transformation is perfect, the original device RGB values $y_j'$ will be obtained since these were the device RGB values which produced the colorimetric RGB locations $x_j'$ measured after printing. To obtain the table device RGB value $y_i$ for one of the inputted RGB locations $x_j'$, a three-dimensional linear or tetrahedral interpolation is performed among a set of values neighboring $x_j'$ as is known in the art. The interpolation does not guarantee that the original device RGB values $y_j'$ are recovered at the colorimetric RGB locations $x_j'$. The table 10 produces residual errors even at the colorimetric RGB locations $x_j'$ that were used to generate the color correction table 10.

For refining the table device RGB values $y_i$, the initial table device RGB values are denoted by $\{y_i^0\}$. The "0" indicates the initial or zero-th iteration. The original colorimetric RGB locations $x_j'$ are inputted to the table 10 and resulting table device RGB values $y_j^0$ are recovered by a three-dimensional linear interpolation technique among the $y_i^0$ as is known in the art. A comparator 20 compares the recovered table device RGB values $y_j^0$ with the originally inputted device RGB values $y_j'$ which were used to generate the table 10. Residual errors $e_j^{0'}$ are determined for each location $x_j'$ as:

$$e_j^0 = y_j^0 - y_j^{0'}, \quad 1 \leq j \leq K \quad (4).$$

The residual error is a difference between the recovered table device RGB value $y_j^0$ and the original device RGB value $y_j^{0'}$ for each measured RGB location $x_j'$. A residual error is found for each of the measured RGB locations in the table 10. Residual errors are found for all other table locations by interpolating the known residual errors. The interpolator 18 interpolates and propagates the known residual errors $e_j^{0'}$ to the other table values $\{y_i^0\}$. This is performed by a method that interpolates smoothly along scattered data. In the preferred embodiment:

$$e_i^0 = \begin{cases} \sum_{j=1}^{K} \frac{1}{d_{ij}^4} e_j^{0'} / \sum_{j=1}^{K} \frac{1}{d_{ij}^4}, & d_{ij} > d_e \\ e_j^{0'}, & d_{ij} \leq d_e \end{cases} \quad 1 \leq i \leq N. \quad (5)$$

A refining means 22 refines the initial device RGB table values $y_i^0$ with the corresponding residual error value $e_i^0$ for each table location $x_i$. The refined table device RGB values $\{y_i^1\}$, after 1 iteration, are:

$$y_i^1 = y_i^0 + e_i^0 \quad (6).$$

The new set of table device RGB values $\{y_i^1\}$ define an improved color correction table. Equations (4) through (6) are carried out for successive iterations. The iterations terminate when a preselected condition is fulfilled such as, the average $e_i$ changing by less than a preassigned percentage. Alternately, a fixed number of iterations can be performed, e.g., 3 iterations.

Although the foregoing discussion has applied the present invention to domain and range spaces in $R^3$ three-dimensional space, the present invention applies to any multidimensional space to improve the fit of the color correction table. For a domain space of $R^n$, $d_{ij}$ in Equations (2) and (5) are raised to a power greater than n so that the summations converge. The dimensionality of the range space does not affect the formulations.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. A method for refining a color response of a printer, the method comprising:
    (a) generating a color correction table, the color correction table including a plurality of RGB locations $x_i$, each of the RGB locations $x_i$ storing a device RGB value $y_i$, for $1 \leq i \leq N$, where N is an integer, the generating including:
        (a1) printing a color patch corresponding to each of a plurality of device RGB values $y_j'$;
        (a2) measuring each of the plurality of device RGB values $y_j'$ printed to obtain a corresponding colorimetric RGB location $x_j'$;
        (a3) calculating a transformation vector $t_j'$ for each of the colorimetric RGB locations $x_j'$, where $t_j' = y_j' - x_j'$ for $1 \leq j \leq K$ where K is an integer less than N and storing the transformation vectors into the color correction table at the colorimetric RGB locations $x_j'$;
        (a4) interpolating the transformation vectors $t_j'$ stored at each of the colorimetric RGB locations $x_j'$ to obtain table transformation vectors $t_i$ for other RGB locations of the color correction table, the table transformation vector $t_i$ being a weighted sum of the transformation vectors $t_j'$ wherein:

$$t_i = \begin{cases} \sum_{j=1}^{K} \frac{1}{d_{ij}^4} t_j' / \sum_{j=1}^{K} \frac{1}{d_{ij}^4}, & d_{ij} > d_t \\ t_j', & d_{ij} \leq d_t \end{cases} \quad 1 \leq i \leq N$$

where $d_{ij}$ is a Euclidean distance between a current location and the colorimetric RGB locations $x_j'$, and $d_t$ is a predetermined threshold value;
        (a5) combining each of the table transformation vectors $t_i$ with the corresponding RGB location $x_i$ to obtain a device RGB value $y_i$ of the color correction table, where $y_i = x_i + t_i$; and,
    (b) refining the device RGB values $y_i$ of the color correction table, the refining including:
        (b1) inputting the colorimetric RGB locations $x_j'$ to the color correction table and recovering corresponding device RGB values $y_i$;
        (b2) comparing, for each of the colorimetric RGB locations $x_j'$, the device RGB value $y_j'$ printed with the corresponding device RGB value $y_i$ recovered to obtain a printer residual error $e_j'$ for each of the colorimetric RGB locations $x_j'$;
        (b3) interpolating, to other locations in the color correction table, a weighted sum of the printer residual errors $e_j'$ combined with a function of a Euclidean distance $d_{ij}$ between a current table location and the colorimetric RGB locations $x_j'$ to obtain a table residual error $e_i$ for each of the RGB locations of the color correction table wherein:

$$e_i = \begin{cases} \sum_{j=1}^{K} \frac{1}{d_{ij}^4} t_j' / \sum_{j=1}^{K} \frac{1}{d_{ij}^4}, & d_{ij} > d_t \\ t_j', & d_{ij} \leq d_t \end{cases} \quad 1 \leq i \leq N$$

(b4) refining the device RGB values $y_i$ of the color correction table by combining the table residual errors $e_i$ with the device RGB values $y_i$; and
        (b5) repeating steps (b1)–(b4) until the table residual errors $e_i$ are within a selected tolerance.

2. A method of refining a color correction table of a printer, the color correction table having a plurality of table locations and being generated by printing a plurality of device color values by the printer into a plurality of colorimetric locations and calculating a transformation vector for each of the plurality of colorimetric locations corresponding to the plurality of device color values, the color correction table converting the plurality of colorimetric locations to the plurality of device color values, the method comprising:

(a) inputting the plurality of colorimetric locations to the color correction table and recovering a corresponding plurality of table color values;

(b) comparing the table color value recovered for the colorimetric location and the device color value corresponding to the colorimetric location to obtain a residual error for each of the plurality of colorimetric locations;

(c) interpolating the residual errors to other locations of the color correction table to obtain a table error for each of the plurality of table locations based on a weighted function of the residual errors and a Euclidean distance between the plurality of table locations and the plurality of colorimetric locations;

(d) refining the table color values of the color correction table with the table errors calculated for each of the plurality of table locations; and, (e) repeating steps (a)–(d).

3. A method of color printing comprising:

(a) causing a color printer to print a set of color patches corresponding to a first set of first color space values {Y1};

(b) generating a first set of second color space values {X1} from the set of color patches, such that there is a correspondence between the first sets of first and second color space values {X1}, {Y1};

(c) interpolating the corresponding first and second color space values {X1}, {Y1} to provide a transformation between an enlarged set of first color space values and an enlarged set of second color space values;

(d) creating a color correction table from the enlarged set of first color space values and the enlarged set of second color space values, which table provides a transformation between the first and second color spaces;

(e) addressing the interpolated color correction table with the first set of second color space values {X1} to retrieve a second set of first color space values {Y2};

(f) comparing the first set of first color space values {Y1} and the second set of first color space values {Y2} to generate a set of error values indicative of a deviation between the first and second sets of first color space values;

(g) interpolating the set of error values to generate an enlarged set of error values;

(h) modifying the color correction table with the enlarged set of error values;

(i) addressing the color correction table with a series of second color space values that represent a picture to retrieve a series of first color space values; and, (j) supplying the series of first color space values to a printer to cause the printer to print the picture.

4. The method as set forth in claim 3 wherein the second color space is a red, green, blue color space.

5. The method as set forth in claim 4 wherein the first color space is a cyan, magenta, yellow, black color space.

6. A method of color printing comprising:

(a) generating a color transformation between a first set of first color space values and a first set of second color space values;

(b) interpolating the corresponding first and second color space values to provide the color transformation between an enlarged set of first color space values and an enlarged set of second color space values;

(c) creating a color correction table from the enlarged set of first color space values and the enlarged set of second color space values, which table provides a transformation between the first and second color spaces;

(d) addressing the interpolated color correction table with the first set of second color space values to retrieve a second set of first color space values;

(e) comparing the first set of first color space values and the second set of first color space values to generate a set of error values indicative of a deviation between the first and second sets of first color space values;

(f) interpolating the set of error values to generate an enlarged set of error values;

(g) modifying the color correction table with the enlarged set of error values;

(h) addressing the color correction table with a series of second color space values that represent a picture to retrieve a series of first color space values; and, (i) supplying the series of first color space values to a printer to cause the printer to print the picture; and (j) iteratively repeating steps (d)–(g) until the error values are minimized.

7. The method as set forth in claim 3 further including:

comparing the set of error values with a preselected condition and repeating steps (e)–(h) until the preselected condition is met.

8. A color correction table of a printer, the color correction table having a plurality of table locations and being generated by mapping a plurality of device locations inputted to the printer to a plurality of colorimetric values outputted by the printer and calculating an error vector for each of the plurality of colorimetric values corresponding to the plurality of device locations, the apparatus comprising:

an input means for inputting the plurality of colorimetric locations to the color correction table and recovering a corresponding plurality of table color values;

a comparing means for comparing the table color value recovered for the colorimetric location and the device color value corresponding to the colorimetric location to obtain a residual error for each of the plurality of colorimetric locations;

an interpolating means for interpolating the residual errors to other locations of the color correction table to obtain a table error for each of the plurality of table locations based on a weighted function of the residual errors and a Euclidean distance between the plurality of table locations and the plurality of colorimetric locations; and, a refining means for refining the table color values of the color correction table with the table errors calculated for each of the plurality of table locations.

* * * * *